United States Patent

[11] 3,596,583

| [72] | Inventor | Peter N. Portugal |
| | | 21A Rowland Court, San Anselmo, Calif. 94960 |
| [21] | Appl. No. | 744,725 |
| [22] | Filed | July 15, 1968 |
| [45] | Patented | Aug. 3, 1971 |

[54] CAMERA
12 Claims, 7 Drawing Figs.

[52] U.S. Cl. .................................................. 95/11.5, 95/15, 95/31
[51] Int. Cl. .................................................. G03b 9/70
[50] Field of Search .......................................... 95/1, 11, 11.5, 15, 18, 31, 85; 355/45

[56] References Cited
UNITED STATES PATENTS

| 2,421,396 | 6/1947 | Schwartz et al. | 95/11 |
| 2,741,168 | 4/1956 | Schreiber | 95/11 |
| 2,751,825 | 6/1956 | Fried | 95/11 |
| 3,263,584 | 8/1966 | Knus | 95/11 |
| 3,453,943 | 7/1969 | Newcomb | 95/11 |

Primary Examiner—Samuel S. Matthews
Assistant Examiner—Fred L. Braun
Attorney—Owen, Wickersham & Erickson ABSTRACT: A camera for photographing closeup objects with a wide angle comprising a housing with a fixed aperture spaced close to a flat base and a mirror within the housing and rearwardly from the aperture for reflecting the viewed image upwardly to a horizontal plane. A light-sealing inner wall surrounds the mirror and cooperates with a film cartridge that fits within the upper portion of the camera. In a battery-powered circuit a main control switch operates in sequence a first mechanism for moving the shutter away from the aperture, a flashgun circuit for providing a momentary high intensity light and a third circuit for releasing a locking device which automatically advances the film in the cartridge to the next exposure frame.

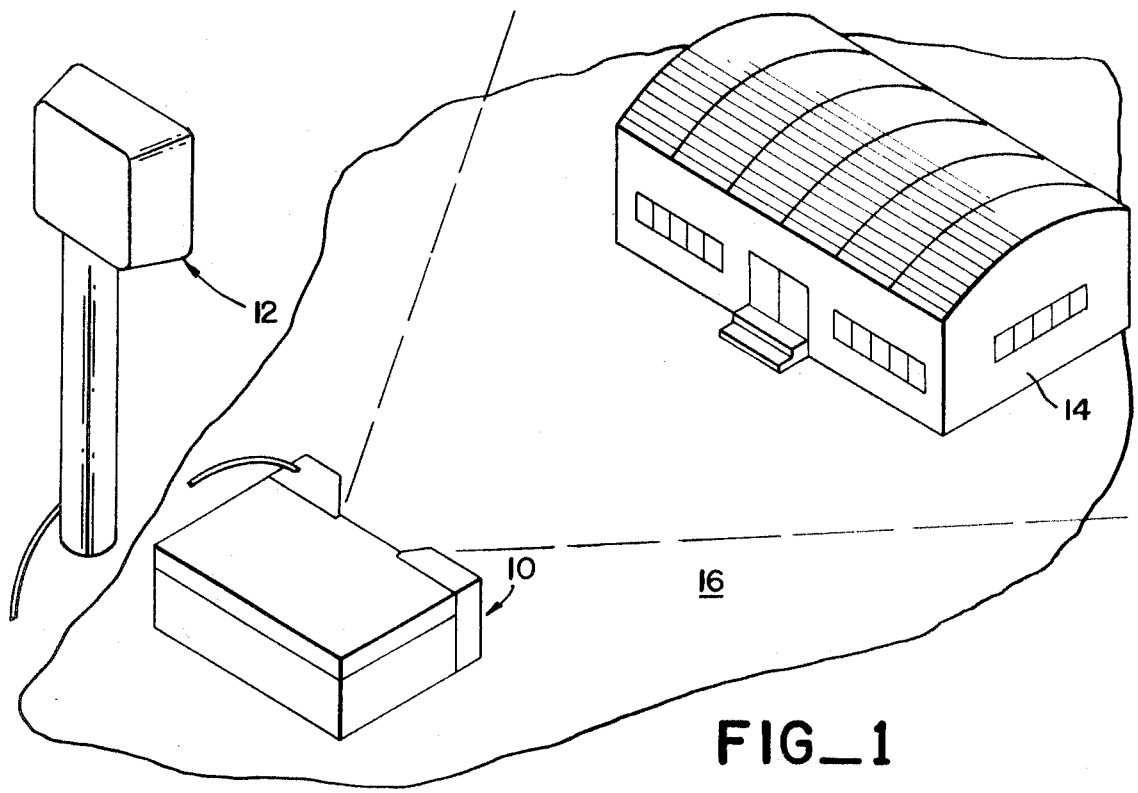
FIG_1
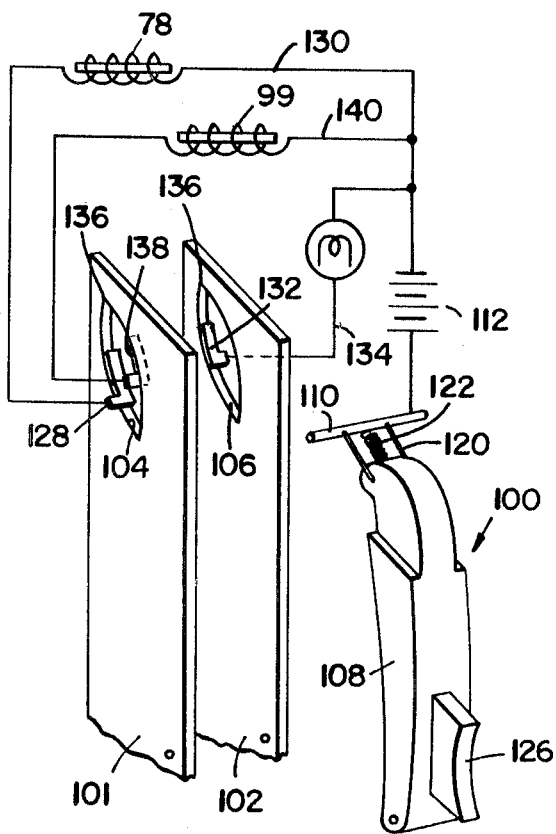
FIG_6
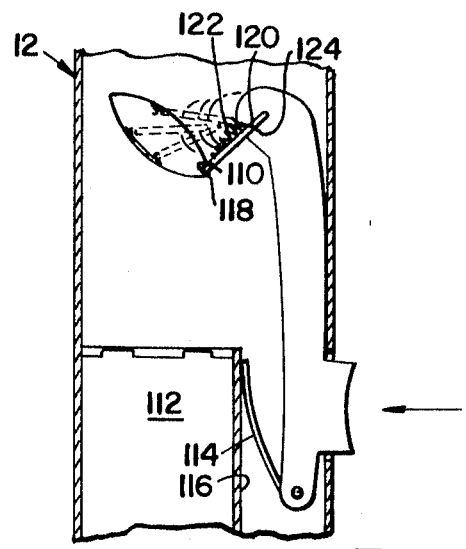
FIG_7
INVENTOR.
PETER N. PORTUGAL
BY
Owen, Wickersham & Erickson
ATTORNEYS

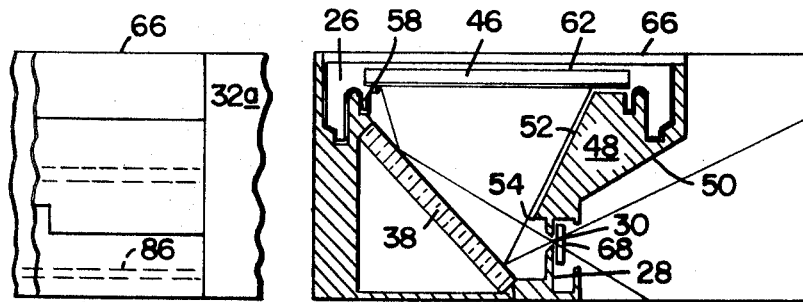
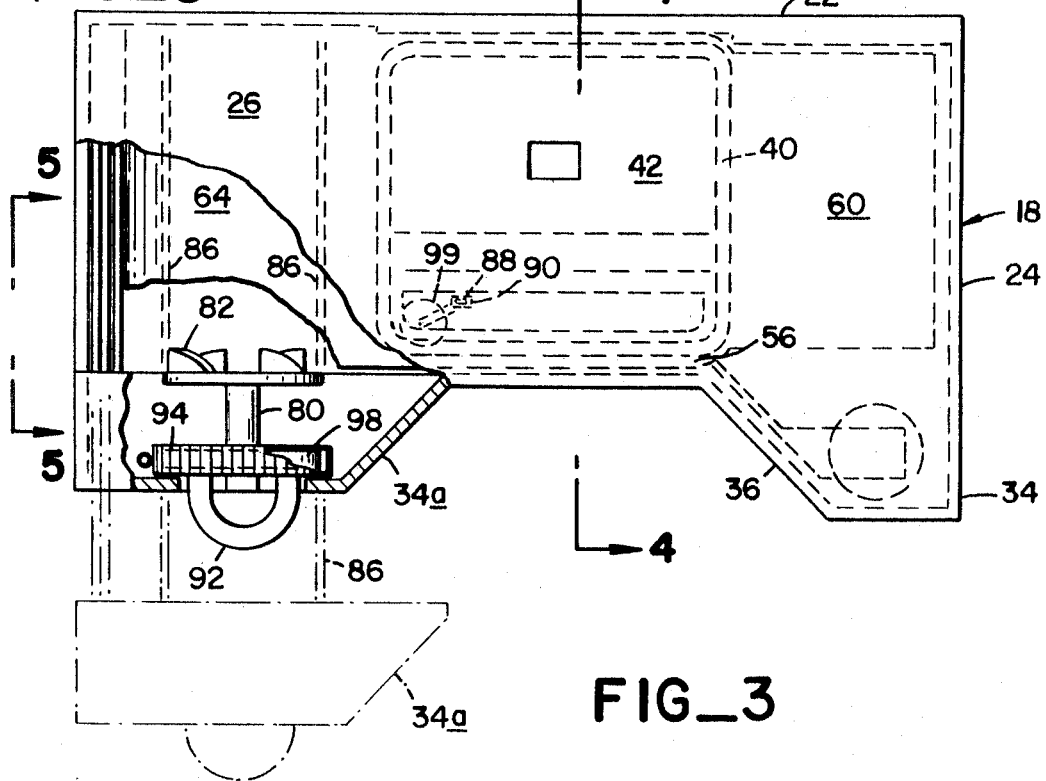
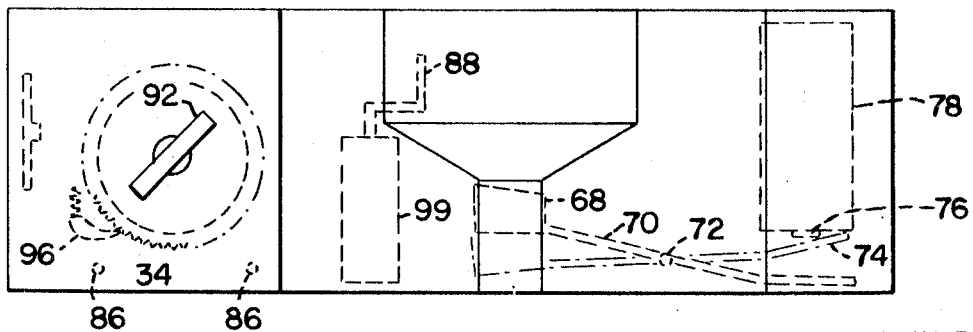

CAMERA

This invention relates to a camera particularly adapted for photographing architectural scale models.

Architectural studies often require the construction of scale models of buildings which include minute structural and artistic detail. Once a model is complete or even at different stages of its construction it is desirable to make photographs which will appear as a structure built to full scale. Heretofore, these photographic results were accomplished to some degree by extremely complicated and expensive photography equipment which had to be manipulated by experienced personnel with considerable skill.

A general object of the present invention is to overcome the aforesaid problem by providing a camera adapted for architectural models that is relatively simple in construction with few moving or adjustable parts and which is extremely easy to operate by even an unskilled operator.

Another object of the present invention is to provide a small camera with a relatively large film size that will consistently produce photographs of scale models that appear to be full-sized objects and have desirable photographic features such as extreme wide angle, high resolution, high contrast and extensive depth of field.

Still another object of my invention provides a camera that is readily adaptable to use standard film cartridges which are commercially available for a wide variety of commercial cameras.

Another object of my invention is to provide a camera that is particularly well adapted for ease and economy of manufacture.

The aforesaid and other objects are accomplished by a camera comprised in broad terms of a lightproof box having a light aperture uniquely located relative to the camera body structure so that when placed on a plane surface in use, the light from the model will enter the camera at the same level as it strikes the eyes of an average viewer of the same scale as the model. The aperture is equivalent in size to a very high "$f$" stop, so that the picture produced will have a large depth of field as well as other favorable photographic characteristics. A shutter mechanism is provided on the camera which normally covers the light aperture and is controlled by an actuator connected in a circuit with a flashgun. The flashgun is connected to electric power so that it will flash shortly after the shutter is moved to the open position. Even though the aperture is small, the flashgun momentarily produces a strong light which is sufficient for the proper exposure. The film supply may be furnished on a commercially available cartridge which fits within the camera body to form a part thereof and connects with a spring-energized windup means. The latter is actuated after an exposure has been made to advance the film automatically.

It is therefore another object of the present invention to provide a camera which, in sequential order, automatically actuates a shutter mechanism, energizes a photoflash apparatus and then advances the film in the camera when a single control switch is operated. This simplicity of operation of the camera coupled with its unique photographic capabilities enable it to be used with unusual ease and efficiency to produce photographic results heretofore extremely difficult to obtain.

Other objects, advantages and features of the present invention will become apparent from the following detailed description of one embodiment thereof presented in conjunction with the accompanying drawings, wherein:

FIG. 1 is a view in perspective of a camera embodying the principles of the present invention as it appears when used typically for photographing scale models of buildings and the like:

FIG. 2 is an enlarged view in front elevation of the camera shown in FIG. 1;

FIG. 3 is a plan view of the camera shown in FIG. 2 with portions broken away;

FIG. 4 is a slightly smaller view in section taken along the line 4—4 of FIG. 3;

FIG. 5 is a fragmentary view in section taken along line 5—5 of FIG. 3;

FIG. 6 is a fragmentary view in perspective showing the flashgun switch arrangement for use with my camera with an accompanying circuit diagram;

FIG. 7 is a view in side elevation of the switch shown in FIG. 6.

Referring to the drawing, FIG. 1 shows a camera 10, embodying the principles of the present invention, as it appears when in normal use for photographing subjects at close range with a wide angle of coverage and yet in considerable detail. When used in conjunction with a photoflash-producing apparatus 12 it is particularly useful, as shown, for photographing an architectural model 14, generally in an arrangement where both the camera and the model are resting on the same plane surface 16.

As shown in FIGS. 2—5, the camera 10 comprises a body or housing 18 of some suitable material having a thin base portion 20 with a rear sidewall 22 and end walls 24 extending upwardly therefrom. The latter form an internal structure which is adapted to receive a film cartridge 26 of the conventional type available for inexpensive amateur cameras. On the camera front side is an aperture plate 28 extending upwardly from the base portion and having a relatively small aperture 30. This aperture plate may be made from a relatively thin piece of some suitable material, such as a metal sheet, which can be easily pierced to form a uniform aperture. The size of this aperture may vary somewhat but generally I prefer that it have a size equivalent to an "$f$" setting in the range of $f/100$ to $f/500$ which includes an aperture roughly of a pinhole size.

The bottom surface 32 of the base portion 20 directly below the aperture is planar so that the camera can rest firmly on a flat surface that supports the model when in use. In plan view (FIG. 3) the aperture plate 28 is set back from and is situated between a pair of protruding front body portions 34 formed by a pair of divergent sidewalls 36. The central axis of the aperture is located relatively close to the bottom surface 32 of the camera. This is an important feature in the arrangement of my camera since it facilitates the production of photographs of scale models which, when developed, make the model appear as a full-scale structure. For example, many model structures are made in the scale of one-sixteenth inch equal to 1 foot. For such models the preferred distance of the aperture axis from the bottom surface is five-sixteenth inch. The photographs produced by this camera thus appear as if taken of a full-sized structure by a camera at eye level (e.g., 5 feet).

The unique optical arrangement which makes this location of the aperture possible includes a mirror 38 within the camera housing located rearwardly of the aperture 30 and held in place at an angle of 45° to the lower camera surface. As shown in FIG. 4, the top edge of the mirror is fixed to one side of a continuous rectangular-shaped inner wall 40. This wall surrounds the mirror and forms a light-sealed chamber 42 in cooperation with the film cartridge 26, when installed. The lower edge of the mirror may be held by a ridge member 44 on the bottom of the housing or may be otherwise secured in place thereto. With the mirror in this inclined position, light rays through the aperture 30 strike the mirror and are reflected upwardly without distortion onto the horizontally oriented surface of strip of film 46 held by the film cartridge 26 on the upper side of the camera.

On the front side of the camera housing is a wall portion 48 just above the aperture having an outer surface 50 which slopes upwardly between the divergent sidewalls 36. This outer wall surface under normal photographic lighting conditions serves to shade the area directly in front of the aperture and thereby prevents extraneous light from reflecting upwardly through the aperture and exposing the film. An inner surface 52 of the wall portion 48 also slopes to allow only the light from the field of view to strike the film while its lower edge 54 cuts off extraneous light.

Between the rear sidewall 22 and the inner wall 40, and also between the front wall 48 and the inner wall 40, a pair of grooves 56 are provided which receive the sides 58 of the film cartridge 26. As previously mentioned, the cartridge may be of the well-known type in which the unused film is wound on an enclosed spool 60 at one end and extends across and through a holding frame 62 onto a windup spool 64 at the other end. When the cartridge is installed properly within the camera, the supply spool and windup portion of the cartridge fit within recesses at opposite ends of the housing with the backside of the cartridge adjacent a hinged cover member 66. A suitable latch (not shown) may be provided for holding the cover member closed.

On the front side of the camera I provide a shutter 68 which is movable from a position in front of the aperture to a position which allows light to pass through it. Various forms of shutters and shutter-actuating systems could be used within the scope of my invention. In the arrangement shown, the shutter is essentially a small plate connected to an arm 70 which is pivotally mounted on a bearing 72 fixed within the housing. Attached to the arm on the other side of the pivot bearing is a magnetically sensitive arm 74 located near the end of an electromagnetic core 76. The latter is surrounded by a coil 78 which when activated by an electric current will create a magnetic force in the core, thereby pulling the magnetic arm 74 upward and causing the shutter 68 to open the aperture.

When the film cartridge 26 is placed within the camera 10 with its windup spool 64 in its proper recess, the latter is automatically aligned with a camera windup shaft 80 and a cogged sprocket wheel 82 attached thereto. The shaft 80 is movable axially or it may be mounted within a movable front portion 34a of the camera that is slidably mounted on a number of guide pins 86 which are mounted in and extend from the housing, as shown in FIG. 5. This enables the sprocket wheel to engage spokes on the cartridge windup spool when the shaft is in its operating position. When the film has been advanced to a position where an exposure is to be made, a locking pin 88 that is constantly urged upwardly through an opening 90 in the front wall portion of the camera extends through an opening in the film cartridge and into an indexing hole that is normally provided in commercial film within the cartridge, thereby preventing the film from being advanced. As shown in FIG. 8, an external winding knob 92 is connected to a circular spring housing 94 having external teeth engageable by a spring-loaded ratchet 96 which thus allows the housing to turn in only the windup direction. A coil spring 98 provided within the housing is attached at one end thereto and at its other end to the shaft 80. Thus, it is seen that, with the film held by the locking pin, the winding knob can be turned to tighten the spring and store energy for advancing the film.

The locking pin 88 is linked to a solenoid actuator 99, which when energized will move the pin downwardly and thereby disengage it from the film. With the pin retracted the film is automatically moved by the force of the spring 98 which turns the shaft 80 windup spool of the film cartridge. The film is thus moved until another index opening allows the locking pin 88, which was only momentarily retracted, to extend upwardly and stop the film in position for another exposure.

In taking pictures of subjects such as architectural models, as shown in FIG. 1, the camera is used in combination with the apparatus 12 for producing a photographic light flash. Battery power for the flash device may also be used to operate the shutter 68 as well as the locking pin 88 that allows the film to advance automatically. By means of a control switch 100 on the flash device 12, these three components are made to operate automatically in their proper sequence, thereby greatly simplifying the operation of my camera.

The switch may be conveniently located in the flashgun and, as shown in FIGS. 6 and 7, comprises a pair of spaced-apart members 101 and 102 having similar oval-shaped openings 104 and 106, respectively, that provide internal cam surfaces. A movable trigger 108 is mounted in the flashgun adjacent the cam members, and fixed to its upper end is a movable contact bar 110 that functions like a cam follower. This bar is connected to and is supplied with current from a battery 112 which may be located in the flashgun. At rest, the trigger is normally urged into its neutral position by a spring 114 connected between its lower pivotal end and a fixed portion 116 of the switch. When in this neutral position the contact bar is located at one end 118 of both the oval openings 104 and 106. The bar 110 is supported at its ends by a pair of arms 120 that are in turn pivotally connected to the upper end of the trigger. A compression spring 122 connected to the bar 110 at one end is connected to the upper end of the trigger at its other end at a point 124 above the arms. This latter spring provides a force that urges the contact bar against the lower cam surfaces of the openings 104 and 106 when the trigger is pulled and against the upper cam surfaces when trigger is released. As force is applied to a grip portion 126 of the of the trigger, as indicated by the arrow in FIG. 7, the contact bar moves from its neutral position along the lower cam surfaces of the openings 104 and 106. It then contacts a first terminal 128 that is flush with the cam surface of one opening 104. As shown in FIG. 6, this completes a circuit from the battery 112 through a lead 130 to the shutter coil 78 causing the shutter 68 to be displaced from the aperture. As the trigger is steadily pulled, the other end of the contact bar contacts another terminal 132 on the lower cam surface of the other opening 106. As again shown in FIG. 6, this completes a circuit through a lead 134 to the flashgun causing a photoflash to occur while the aperture is open. After the contact bar moves past the first and second terminals causing the circuits for the flashgun and shutter to open, it arrives at the upper ends 136 of the openings 104 and 106. Now, as pressure on the trigger is released, the contact bar being urged upwardly against the upper cam surfaces of the openings 104 and 106, contacts a third terminal 138. This completes a circuit through a lead 140 to the actuator 99 for locking pin 88, thereby moving the latter and causing the film to advance to its next exposure as previously described. After contacting the third terminal, the contact bar returns to its neutral position and the camera is ready to take another picture. The entire actuation of the camera with the trigger system described comprises a simple pulling force and release by the operator. While the aforesaid actuating system has been found to provide an unusual ease and simplicity of operation, it is to be understood that other actuating or switching systems could be devised within the scope of the invention.

In operation, as shown in FIG. 1, the camera is preferably placed on a plane surface which is also the same level of the model. Since the aperture 30 is close to the supporting surface of the camera, it is also essentially at the ground level of the model, and the picture taken appears as one taken of a full-scale structure. Light forming the optical image of the subject passes through the aperture and onto the mirror 38 which reflects it onto the horizontally oriented film above. The intensity of the flash can be made to be compatible with the film utilized and the size of the aperture. Since the duration of the flash is relatively short, the opening and closing of the aperture shutter 68 is not critical.

An important feature of my camera, aside from its unique capability of producing pictures of scale models which appears to be those of full-sized structures, is the simplicity and thus the economy of its construction. The camera housing, for example, may be constructed as a moded unit from a suitable inexpensive plastic material. The winding mechanism and the shutter mechanism are both simple in structure as well as in their operation. No complex optical systems are required, and yet an extremely high quality of photos can be produced.

To those skilled in the art to which this invention relates many changes in construction and widely differing embodiments and applications of the invention will suggest themselves without departing from the spirit and scope of the invention. The disclosures and the description herein are purely illustrative and are not intended to be in any sense limiting.

I claim:

1. A camera adapted for photographing objects from a point relatively close to a surface supporting the object, comprising:

a camera body forming a lightproof chamber having sidewalls and a base portion with an external horizontal bottom surface;

means forming a small aperture on one said sidewall of said body at a relatively close predetermined distance from said bottom surface;

mirror means fixed within said body and inclined to the plane of said bottom surface for reflecting light rays passing through said aperture upwardly onto the surface of unexposed film supported parallel to said base portion; and light-sealing wall means above the upper end of said mirror engageable with a means for holding said film to form said lightproof chamber.

2. The camera as described in claim 1 including a forward wall-forming shield means extending upwardly at an angle above said aperture for preventing light rays passing through said aperture from directly striking said film.

3. The camera as described in claim 1 wherein said aperture is less than 0.50 inches from the bottom surface of said base portion.

4. The camera as described in claim 1 wherein said aperture is equivalent to an "$f$" setting in the range of $f/100$ to $f/500$.

5. The camera as described in claim 1 wherein said mirror means for reflecting light through said aperture is mounted within said body and supported on said base portion below said aperture and is sloped rearwardly at an angle of 45° to said base portion.

6. The camera as described in claim 1 wherein said light-sealing wall means includes elongated grooves and said means for holding film comprises a cartridge having a supply roll of film at one end, a windup spool at its other end, and a film frame between said supply roll and said windup roll with side portions that fit into said grooves and form said lightproof chamber in cooperation with said camera body.

7. The camera as described in claim 6 including film-advancing means comprising an external knob means, a shaft having a sprocket and engageable with said windup spool of said film cartridge, a spring interconnecting said knob means and said shaft, ratchet means for preventing the turning back of said knob means, a locking means for holding the film on a fixed position while said knob can be turned to tighten said spring, and means for moving said locking means to release it momentarily from said film and allow the latter to advance automatically.

8. The camera as described in claim 7 wherein said locking means comprises a pin and said means for moving said pin comprises a second electrical actuator within said camera body linked to said pin and operable by said switch means on said flashing producing means.

9. A camera adapted for photographing architectural models, comprising:

a housing having a bottom surface and sidewalls;

means forming an aperture spaced upwardly less than one-half inch from said bottom surface;

a fixed mirror within said housing inclined rearwardly of said aperture at an angle 45° to said bottom surface;

wall means engageable with a film-holding means to form a light-sealed chamber around said unexposed film and said mirror;

shutter means for covering said aperture;

means for actuating said shutter to displace it from said aperture;

a flashgun for providing a photoflash;

switch means on said flashgun for actuating said shutter means just prior to producing a photoflash;

means on said camera for producing a windup force on a film strip extending above said mirror;

locking means for retaining the film strip in a predetermined position; and means for releasing said locking means.

10. The camera as described in claim 9 wherein said means for releasing said locking means is actuated by said switch means after the photoflash has occurred.

11. The camera as described in claim 9 wherein said camera housing includes forwardly extending portions with sidewalls diverging outwardly from opposite sides of said aperture, said shutter-actuating means being in one said portion and said means for producing a windup force being in said other portion.

12. The camera as described in claim 9 wherein said switch means comprises a pair of cam surfaces with first, second and third contact means fixed on said cam surfaces, said first contact means being connected to a circuit for actuating said shutter, said second contact means being connected to a circuit for energizing said photoflash gun, and said third contact means being connected to a circuit for releasing said locking sequence, a movable contact means and trigger means supporting said movable contact means for moving it sequentially across said first, second and third fixed contact means.